United States Patent
Abe et al.

(10) Patent No.: US 10,562,243 B2
(45) Date of Patent: Feb. 18, 2020

(54) FRP SHAPING JIG AND METHOD OF SHAPING FRP STRUCTURE

(71) Applicant: MITSUBISHI HEAVY INDUSTRIES, LTD., Tokyo (JP)

(72) Inventors: Toshio Abe, Tokyo (JP); Kiyoka Takagi, Tokyo (JP); Takayuki Koyama, Tokyo (JP); Katsuya Yoshino, Tokyo (JP); Kazuaki Kishimoto, Tokyo (JP); Koichi Saito, Aichi (JP); Takashi Ishida, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 247 days.

(21) Appl. No.: 15/107,723

(22) PCT Filed: Jan. 27, 2015

(86) PCT No.: PCT/JP2015/052222
§ 371 (c)(1),
(2) Date: Jun. 23, 2016

(87) PCT Pub. No.: WO2015/115437
PCT Pub. Date: Aug. 6, 2015

(65) Prior Publication Data
US 2016/0332395 A1 Nov. 17, 2016

(30) Foreign Application Priority Data
Jan. 31, 2014 (JP) .................................. 2014-017314

(51) Int. Cl.
*B29C 70/44* (2006.01)
*B29C 70/06* (2006.01)
*B29C 70/54* (2006.01)

(52) U.S. Cl.
CPC ............ *B29C 70/443* (2013.01); *B29C 70/06* (2013.01); *B29C 70/541* (2013.01)

(58) Field of Classification Search
CPC ..... B29C 70/443; B29C 33/485; B29C 33/52; B29C 70/06; B29C 70/446; B29C 70/541; B29D 24/008; B29K 2995/0012
See application file for complete search history.

(56) References Cited

U.S. PATENT DOCUMENTS 4,389,367 A * 6/1983 Hudson .................. B29C 33/52
264/102
5,469,686 A 11/1995 Pykiet
(Continued)

FOREIGN PATENT DOCUMENTS

EP 2 327 525 6/2011
EP 2327525 A1 * 6/2011 ......... B29C 33/3814
(Continued)

OTHER PUBLICATIONS

International Search Report dated Apr. 14, 2015 in corresponding International Application No. PCT/JP2015/052222.
(Continued)

*Primary Examiner* — Kelly M Gambetta
(74) *Attorney, Agent, or Firm* — Wenderoth, Lind & Ponack, L.L.P.

(57) ABSTRACT

A core (20) and a bag (22, 24) are provided which are used to shape an FRP structure (10; 30). The bag (22, 24) has a core bag section (24) which covers the outer circumference of the core (20), and a coverture bag section (22) which covers a plurality of fiber components (12, 14; 12, 14, 16).

7 Claims, 8 Drawing Sheets

(56) References Cited

U.S. PATENT DOCUMENTS

| | | | |
|---|---|---|---|
| 5,654,518 A | | 8/1997 | Dobbs |
| 6,350,337 B1 * | | 2/2002 | Nakamura .............. B29C 33/52 156/155 |
| 6,702,911 B2 | | 3/2004 | Toi et al. |
| 7,625,618 B1 | | 12/2009 | Allen et al. |
| 2007/0221322 A1 * | | 9/2007 | Greis ..................... B29C 33/52 156/285 |
| 2010/0038030 A1 | | 2/2010 | Allen et al. |
| 2010/0044912 A1 * | | 2/2010 | Zahlen ................. B29C 33/505 264/219 |
| 2013/0020438 A1 | | 1/2013 | Glynn et al. |

FOREIGN PATENT DOCUMENTS

| | | | |
|---|---|---|---|
| JP | 62-83112 | | 4/1987 |
| JP | 9-189499 | | 7/1997 |
| JP | 2009-179001 | | 8/2009 |
| JP | 2009-191092 | | 8/2009 |
| JP | 2010-131838 | | 6/2010 |
| JP | 2010131838 A | * | 6/2010 |
| RU | 2 480 334 | | 4/2013 |
| WO | 2013/012505 | | 1/2013 |
| WO | 2013/151617 | | 10/2013 |

OTHER PUBLICATIONS

Extended European Search Report dated Dec. 6, 2016 in corresponding European Application No. 15742575.2.

Notification of Reasons for Refusal dated Mar. 21, 2017 in corresponding Japanese Application No. 2014-017314 (with English translation).

Office Action dated Aug. 31, 2017 in corresponding Russian Patent Application No. 2016124736 (with concise explanation of relevance).

International Preliminary Report on Patentability dated Aug. 11, 2016 in corresponding International Application No. PCT/JP2015/052222 (with English translation).

* cited by examiner

FRP SHAPING JIG AND METHOD OF SHAPING FRP STRUCTURE

TECHNICAL FIELD

The present invention relates to an FRP (fiber reinforced plastic) shaping jig used to shape an FRP structure and a method of shaping the FRP structure.

BACKGROUND ART

In recent years, the application field of an FRP structure is widening to an industrial product field. The reduction of the number of parts and the reduction of the number of assembler steps through integration could be given as the merit of the FRP structure.

When the integration of parts is carried out, there is occasionally a portion where a closed space is formed. When the FRP structure with the closed space should be shaped, a method of applying a pressure in case of shaping and a relation between a jig and the closed space become problems.

For example, in US 2013/0020438A1 (Patent Literature 1), a first fiber preform is arranged on a corrugated jig, as shown in FIG. 25 of Patent Literature 1, and a core (mandrel) covered with a second fiber preform is arranged on the top of the corrugated jig. Then, a fillet shaping jig is arranged and all the things arranged are covered with a third fiber preform. Then, after the laminated preforms and the jigs are wrapped with a suction bag, the inside of the suction bag is evacuated and a matrix resin as a base material is injected into the suction bag. After that, it is coupled to an outer skin, after cutting in a predetermined length through heating and curing.

Also, as a related technique, Patent Literature 2 discloses a method of manufacturing a composite material reinforcing plate. In the manufacturing method disclosed in Patent Literature 2, a first textile material (plate) is first put on a jig having a panel surface shape. Subsequently, a reinforcing material is put on the first textile material. Subsequently, another textile material (second textile material) is arranged on the reinforcing material to cover at least a part of the reinforcing material. Subsequently, the second textile material is shaped to fit the shape of the reinforcing material. Subsequently, the shaped second textile material and the first textile material are stitched along the edge portion of the reinforcing material. Subsequently, the reinforcing material, the first textile material and the second textile material are covered with a bag pack. Subsequently, a resin is introduced or impregnated into each textile material by an RTM method or an RFI method. The impregnated resin is heated to be cured.

A method of shaping a reinforcing panel material is disclosed in Patent Literature 3. In the method of shaping according to Patent Literature 3, a first set of curable composite material sheets is arranged on a jig. Subsequently, each of a plurality of mandrels is wrapped with a corresponding one of a plurality of second curable composite material sheets. Subsequently, the plurality of wrapped mandrels are arranged on the composite material sheets of the first set to be put in parallel to each other. Subsequently, the composite material sheets of the first set and the plurality of second composite material sheets are cured. Subsequently, the mandrels are removed from the cured composite material sheets (the composite material sheets of the first set and the plurality of second composite material sheets).

A method of manufacturing a composite material part is disclosed in Patent Literature 4. In the shaping method according to Patent Literature 4, a first un-cured composite material layer is prepared. Subsequently, at least one hollow mandrel is arranged on the first un-cured composite material layer. Subsequently, a second un-cured composite material layer is arranged on the hollow mandrel and the first un-cured composite material layer. Subsequently, the first un-cured composite material layer and the second un-cured composite material layer are cured in an autoclave.

In the shaping method according to Patent Literature 1, reinforcing fiber preforms are positioned by using the hard core, to shape a small-scale FRP structure. In such a shaping method, it is difficult to shape a large-scale FRP structure using prepreg members superior in dynamics characteristic. Also, according to a difference among the jig, the core and the FRP structure in thermal expansion rate, there is a problem that the size precision is degraded.

FIG. 8 and FIG. 9 are sectional views showing conventional methods of shaping a cylindrical FRP structure. In the method of shaping the FRP structure shown in FIG. 8, a reinforcing fiber 92 is arranged outside a hard core 90 (a hard tool), and the outer circumference of the reinforcing fiber 92 is covered with a suction bag 94. The interior of the suction bag 94 is evacuated. Then, after carrying out heating and curing, the suction bag 94 is removed, and the hard core 90 is pulled out to finish the cylindrical FRP structure. In this shaping method, the hard core 90 exists under the environment of a positive pressure.

In the method of shaping the FRP structure shown in FIG. 9, a reinforcing fiber 92 is arranged inside a hard outer die 91 (a hard tool) and a pressurizing bag 95 is arranged inside the reinforcement fiber 92. Then, the reinforcing fiber 92 is pressurized with the pressurization bag 95. Then, after carrying out heating and curing, the pressurizing bag 95 is removed. Then, a cylindrical FRP structure is pulled out of the hard outer die 91.

In the shaping method shown in FIG. 8, when a closed space does not have a constant sectional shape, but has a complicated shape with a curvature, there are many cases where a releasing process of taking out the hard core 90 from the FRP structure is difficult, after shaping the FRP structure by using the hard core 90. Also, in order to improve the precision of an outer size in case of shaping, it is desirable to use the shaping method shown in FIG. 9. However, when the FRP structure having the complicated form is shaped, there is a problem in the method of pressurizing from the inside of the hard outer die 91. From such a reason, it is difficult to shape an FRP structure with the complicated shape so as to have a plurality of closed spaces.

CITATION LIST

[Patent Literature 1] US 2013/0020438A1
[Patent Literature 2] U.S. Pat. No. 6,702,911
[Patent Literature 3] U.S. Pat. No. 5,469,686
[Patent Literature 4] U.S. Pat. No. 7,625,618

SUMMARY OF THE INVENTION

An object of the present invention is to provide an FRP shaping jig and a method of shaping the FRP structure, in which the FRP structure with a closed space is shaped in a high precision.

The FRP shaping jig of the present invention includes a core and a bag which are used to shape an FRP structure which contains a plurality of fiber components. The bag has a core bag section which covers the outer circumference of the core, and a coverture bag section which covers a plurality of fiber components.

The method of shaping an FRP structure of the present invention contains arranging a first fiber component and a second fiber component in a bag which has a coverture bag section. The arranging includes arranging the first fiber component on the jig directly or through the coverture bag section; arranging a first core covered with the core bag section on the first fiber component; and arranging a second fiber component on the first fiber component and the first core. The method of shaping an FRP structure contains evacuating the interior of the bag in which the first fiber component and the second fiber component.

By using the FRP shaping jig and a method of shaping the FRP structure according to the present invention, the FRP structure with a closed space can be shaped in a high precision.

BRIEF DESCRIPTION OF THE DRAWINGS

The attached drawings are incorporated into the Description to help the description of embodiments. Note that the drawings should not be interpreted as the present invention is limited to examples to be illustrated and described.

DESCRIPTION OF THE EMBODIMENTS

Embodiments of an FRP shaping jig and a method of shaping an FRP structure will be described below with reference to the attached drawings. In the following detailed description, many detailed specific items are disclosed for the purpose of the description in order to provide the comprehensive understanding of the embodiments. However, it would be seen that one or plural embodiments are executable without these detailed specific items.

Figure 1:
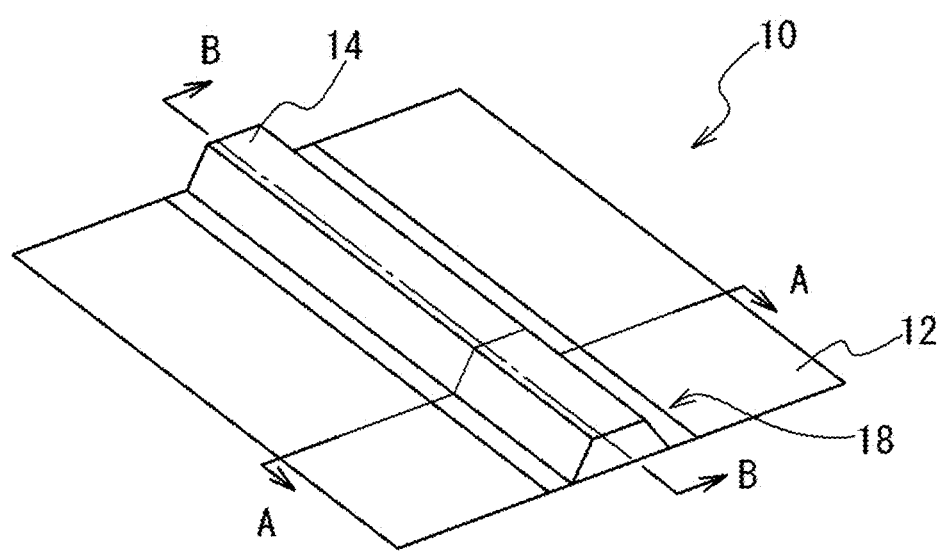
FIG. 1 is a perspective view showing an outward appearance of an FRP structure shaped by using an FRP shaping jig according to an embodiment.
Figure 2:
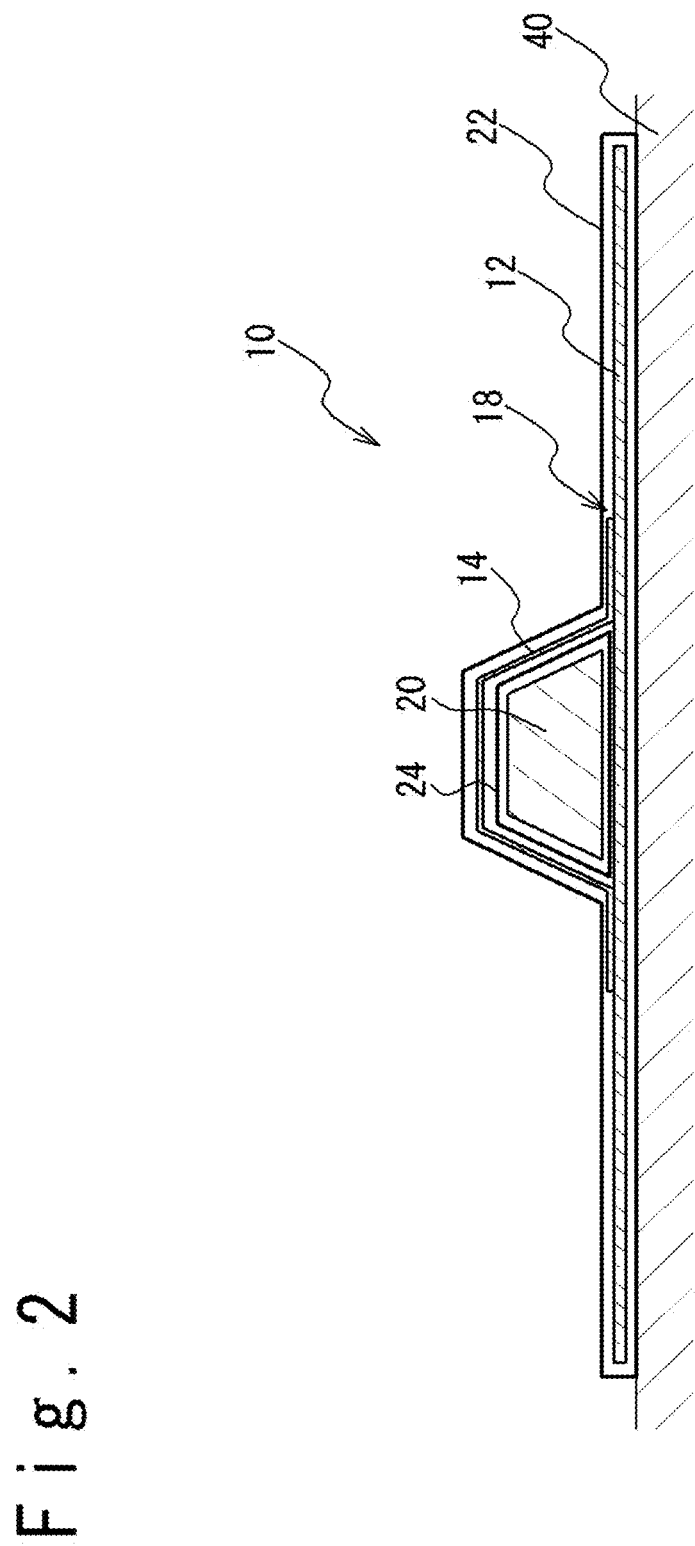
FIG. 2 is a diagram showing a state that the FRP structure is shaped by using the FRP shaping jig of the embodiment and is a sectional view of the FRP structure along the A-A line in FIG. 1.
Figure 3:
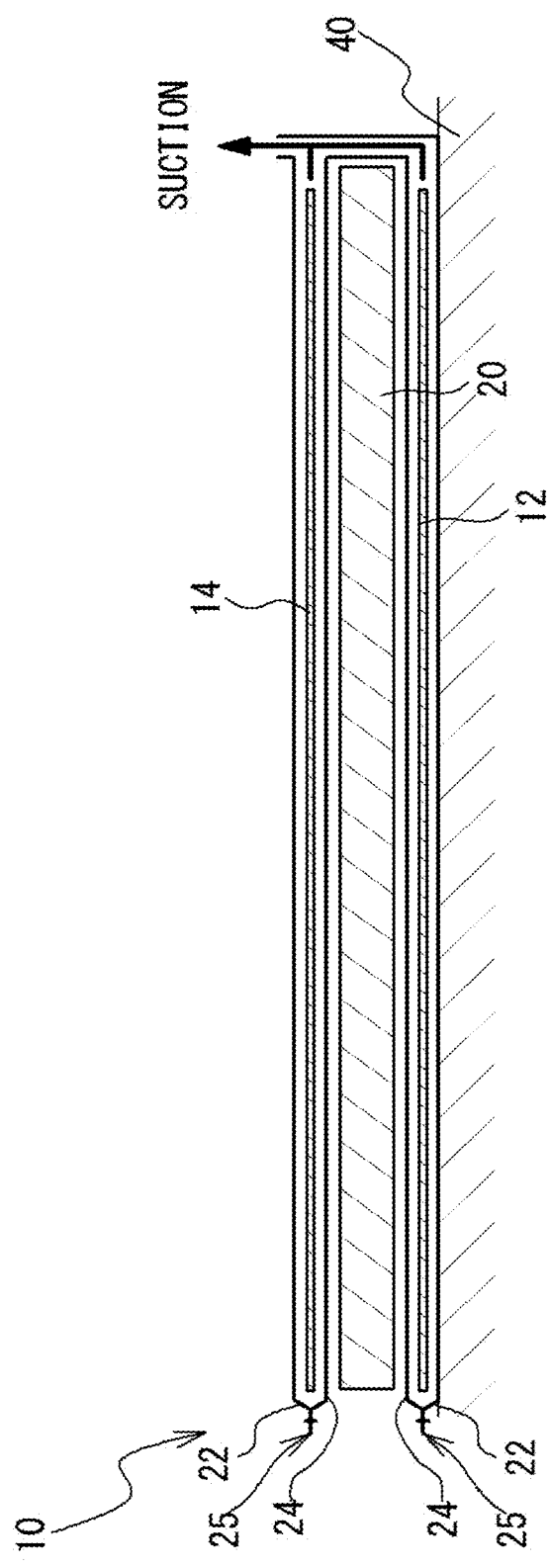
FIG. 3 is a diagram showing a state that the FRP structure is shaped by using the FRP shaping jig of the embodiment and is a sectional view of the FRP structure along the B-B line in FIG. 1.

FIG. 1 is a perspective view of an outward appearance of the FRP structure 10 shaped by using an FRP shaping jig. FIG. 2 is a diagram showing a state when the FRP structure 10 is shaped by using the FRP shaping jig, and is a sectional view of the FRP structure 10 along the A-A line in FIG. 1. FIG. 3 is a diagram showing a state when the FRP structure 10 is shaped by using the FRP shaping jig, and is a sectional view of the FRP structure 10 along the B-B line in FIG. 1.

Referring to FIG. 1, the FRP structure 10 has an outer skin 12, a stringer 14 and a joining part 18 that joins the outer skin 12 and the stringer 14. The FRP structure 10 shown in FIG. 1 has a closed space with a trapezoidal sectional shape between the stringer 14 and the outer skin 12. Note that in this Description, the closed space means a space in which a portion except ends is surrounded by a member. For example, an inner space of a square pipe having openings at both ends (a space surrounded by four sides of the square pipe) is the closed space. In this Description, the closed space includes a space in which at least one end is closed and a portion except the other end is surrounded by members. For example, the inner space of the square pipe in which one end is closed and the other end is opened (a space surrounded by four sides of the square pipe and one closed end) is the closed space.

The outer skin 12 is, for example, a plate-like FRP, and the stringer 14 is, for example, an FRP member having a sectional shape of a convex shape (for example, the sectional shape of a trapezoidal shape). In the FRP structure 10 shown in FIG. 1, the stringer 14 is arranged in a line on the outer skin 12, but the stringers 14 may be arranged in plural lines on the outer skin 12. Also, the outer skin 12 may have a large size or a small size.

The joining part 18 joins the outer skin 12 and the stringer 14 and bonds them by using an adhesive film, an adhesive material, a matrix resin and so on.

Referring to FIG. 2 and FIG. 3, a method of shaping the FRP structure 10 will be described. A bag is used for the shaping of the FRP structure 10. The bag includes a coverture bag section 22 and a core bag section 24.

When the FRP structure 10 should be shaped, the coverture bag section 22 (a first coverture bag section) is arranged on the jig 40 which has a predetermined shape. The coverture bag section 22 may have a pipe shape in which both ends are open. Alternatively, the coverture bag section 22 may have the pipe shape in which one end is closed and the other end is opened. The inside of the pipe shape corresponds to the inside of the coverture bag section 22. Alternatively, the coverture bag section 22 may be configured from two sheets. In this case, the space surrounded by the two sheets (a space formed between the two sheets) corresponds to the inside of the coverture bag section 22. A first coverture bag section means a part of the coverture bag section 22 arranged on the jig 40 in contact with it. The outer skin 12 (a first fiber component) is arranged inside the coverture bag section 22. Next, a core 20 covered with the core bag section 24 is arranged on the outer skin 12 in the coverture bag section 22. For example, the core bag section 24 may have a pipe shape in which one end is closed and the other end is opened. For example, the core 20 has a shape complementary to the closed space of the FRP structure 10.

Note that the coverture bag section 22 and the core bag section 24 may be separated. When the coverture bag section 22 and the core bag section which are separated are used, the coverture bag section 22 and the core bag section 24 may be joined to each other after the outer skin 12 (the first fiber component) is arranged inside the coverture bag section 22. Alternatively, the coverture bag section 22 and the core bag section 24 may be joined to each other before the outer skin 12 (the first fiber component) is arranged inside the coverture bag section 22.

Figure 10A:
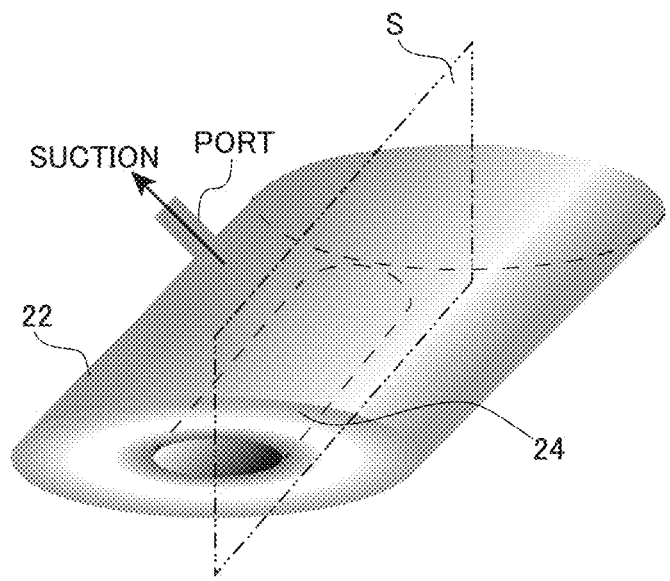
FIG. 10A is a diagram showing an example of a bag.
Figure 10B:
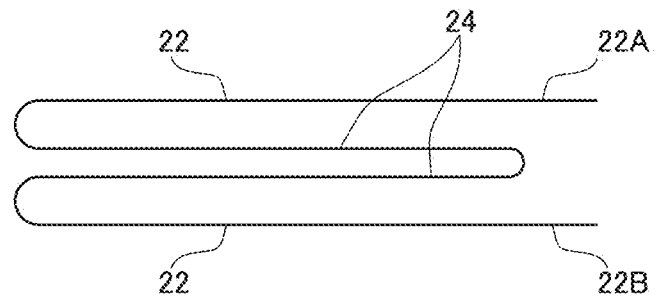
FIG. 10B is a sectional view (longitudinal sectional view) in a surface S in FIG. 10A.

As shown in the FIG. 10A and FIG. 10B, a bag in which the coverture bag section 22 and the core bag section 24 are unified may be used. Note that in an example shown in the FIG. 10A and FIG. 10B, after the outer skin 12 (the first fiber component) and the stringer 14 (a second fiber component) to be described later are arranged inside the coverture bag section 22, an end part 22A and an end part 22B of the coverture bag section 22 are joined to form a closed space.

The coverture bag section 22 may be an outer bag. Also, the core bag section 24 may be an inner bag. A space between the outer bag and the inner bag may be a closed space in which a plurality of fiber components are joined.

An adhesive material such as an adhesive film may be arranged between the outer skin 12 and the stringer 14. That is, the outer skin 12 and the stringer 14 may be joined through the adhesive material such as the adhesive film.

Next, the stringer 14 is inserted into the coverture bag section 22. Note that the insertion of the stringer 14 into the coverture bag section 22 may be carried out simultaneously with the insertion of the outer skin 12 into the coverture bag section 22. The stringer (the second fiber component) 14 is arranged on the outer skin 12 and the core 20. Note that the arrangement of the stringer 14 (the second fiber component) on the core 20 means that the stringer 14 (the second fiber component) is arranged on the core 20 covered with the core bag section 24.

Next, when the coverture bag section 22 and the core bag section 24 are separate bodies, ends of the coverture bag section 22 and the core bag section 24 are joined at a bag joining part 25 to secure airtightness of the bag (reference to FIG. 3). In this state, a communication between the inside of the bag (an inner space) and the outside of the bag is limited to a suction port as a part through which an arrow corresponding to "suction" passes in FIG. 3. In other words, the inside of the bag (the inner space) does not communicate with the outside of the bag (the atmosphere and so on) in any part of the bag other than the suction port. A portion where the fiber component of the outer skin 12 and the stringer 14 are arranged (namely, the inside of the bag) is evacuated to apply a pushing pressure to the joining section 18 by using the atmosphere pressure. At this time, when a fiber reinforced base material in which any resin is not impregnated is used as the material of the outer skin 12 or the stringer 14, a matrix resin is injected into the fiber reinforced base material to impregnate the fiber reinforced base material with the matrix resin. Note that even if the inside (interior) of the bag where the outer skin 12 and the stringer 14 are arranged is evacuated, the core 20 exists under the atmosphere pressure environment. Therefore, the deformation of the core 20 can be made little, and the size precision of the FRP structure 10 can be improved.

The reason that the core 20 exists under the atmosphere pressure environment is in that the core 20 is not arranged inside the bag. That is, the core 20 is arranged outside the bag. The core 20 is surrounded by the outer surface of the bag (more specifically, the core 20 is surrounded by a surface of the core bag section 24 which does not face the outer skin 12 or the stringer 14, i.e., the outer surface). It can be said that a space surrounded by the core bag section 24 (i.e., a space that is surrounded by the outer surface of the bag and in which the core 20 is arranged) and the inner space of the bag (the inside of the coverture bag section 22) are separated from each other. Note that the separation from each other means that a fluid does not communicate to each other. It can be said that the core bag section 24 is an inverted portion of the bag.

When a thermosetting type material is used as an adhesive material or the matrix resin, the heating is carried out to cure the adhesive material or the matrix resin, after the evacuation is carried out.

When the adhesive material or the matrix resin has been cured, the coverture bag section 22 is taken out and the core bag section 24 and the core 20 are taken out of the closed space of the FRP structure 10. In this way, the FRP structure 10 shown in FIG. 1 is obtained. Alternatively, the core 20 is taken out of the closed space of the FRP structure 10, and after that, the coverture bag section 22 and the core bag section 24 may be taken out of the FRP structure 10 at the same time.

When the fiber reinforced base material is used for the configuration of the fiber component of the outer skin 12 and the stringer 14, a reinforcing fiber thread group in which the continuous reinforcing fiber threads are arranged in parallel can be used. Also, a 1-directional material, a 2-directional material, and a multi-directional material of the reinforcing fiber threads can be used according to need. Also, for example, as another organization form of the fiber reinforced base material, the woven organization (textile), a knitting organization (the vertical knitting, the horizontal knitting), the non-woven organization or a combination of them can be used.

Also, as the reinforcing fiber in the fiber component, carbon fiber, glass fiber, aramid fiber, polyparaphenylene benzobisoxazole fiber, phenol fiber, polyethylene fiber, organic fiber such as polyvinyl alcohol fiber, metal fiber, ceramic fiber, and a combination of them and so on can be used.

Also, as the matrix resin, thermoplastic resin or thermosetting resin can be used. It is desirable to use thermosetting resin from the viewpoint of shapability and dynamics characteristics. As thermosetting resin, for example, the resins of epoxy, phenol, vinylester, unsaturated polyester, cyanate ester, bismaleimide, benzoxazine, acrylate and so on can be used. Moreover, the resin to which elastomer, rubber, curing material, curing accelerator, catalyst and so on are added can be used. Note that it is desirable to arrange die release material and resin diffusion media on the side of the fiber components of the coverture bag section 22 and the core bag section 24.

Also, as the material of the core 20, a material having flexibility (hard rubber, silicon rubber and so on) and a material having brittleness to make die release easy through fracturing (plaster and so on).

Figure 4:
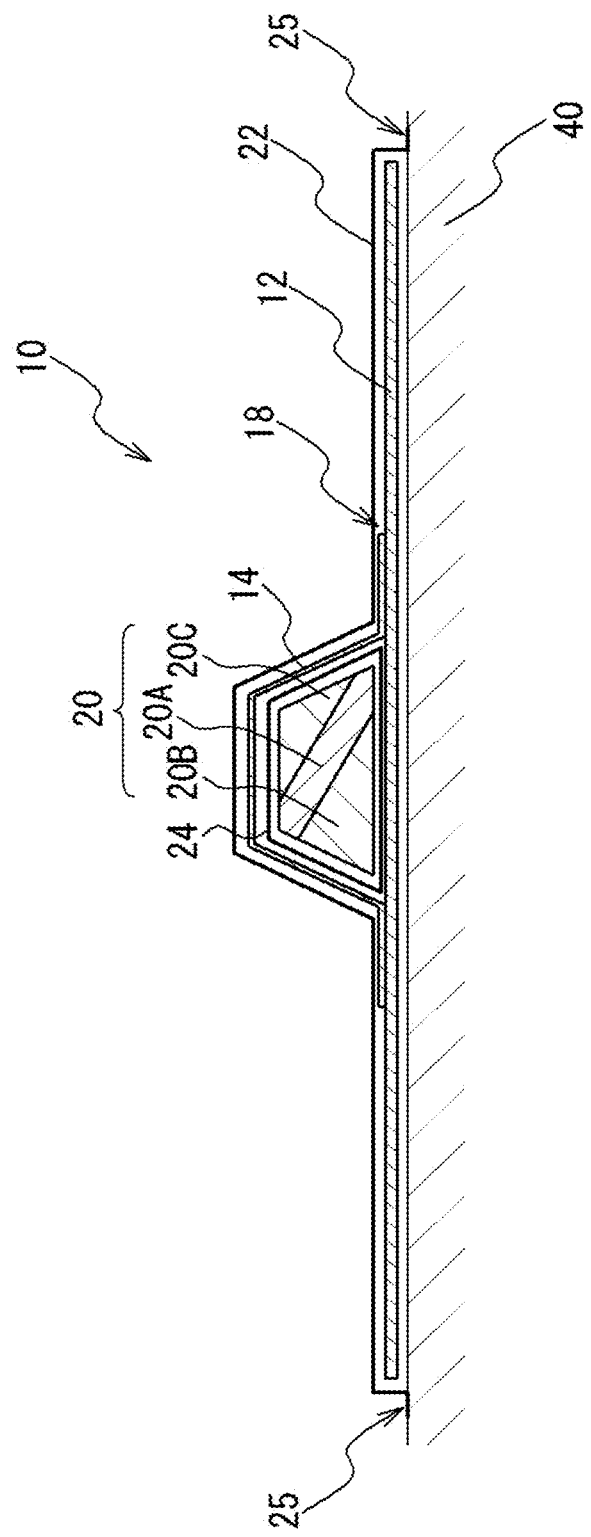
FIG. 4 is a diagram showing a state that the FRP structure is shaped by using the FRP shaping jig of another embodiment and is a sectional view of the FRP structure along the A-A line in FIG. 1.

Next, an embodiment in which the outer skin 12 is arranged directly on the jig 40 to shape the FRP structure 10 and an embodiment in which the core 20 of a split-type structure is used will be described with reference to FIG. 4. FIG. 4 is a diagram showing another embodiment in which the FRP structure is shaped by using the FRP shaping jig and is a sectional view showing the FRP structure along the A-A line in FIG. 1. Note that portions having the same functions as the components in the embodiments shown in FIG. 1 to FIG. 3 are assigned with the same reference numerals, and the description is omitted.

In the embodiments shown in FIG. 2 and FIG. 3, the coverture bag section 22 is arranged on the jig 40, and the outer skin 12 is arranged inside the coverture bag section 22. On the other hand, in the embodiment shown in FIG. 4, the outer skin 12 is arranged directly on the jig 40 having a gas shield effect, a closed space formed by the jig 40 and the coverture bag section 22 (in other words, the closed space between the jig 40 and the coverture bag section 22) is evacuated. That is, a portion where the outer skin 12 and the stringer 14 (the first and second fiber components) are arranged is evacuated to apply the pushing pressure to the joining section 18 by using the atmosphere pressure. Even if being configured in this way, the FRP structure 10 having the closed space can be shaped. Note that in this embodiment, the inside of the bag means a closed space which is formed by the jig 40 and the coverture bag section 22.

Also, the structure of the core 20 may be of a split-type structure in which the core 20 includes a plurality of parts of a longitudinal direction slide core 20A and lateral direction slide cores 20B and 20C, as shown in FIG. 4. In this case, after the longitudinal direction slide core 20A is pulled out (to a forward direction in FIG. 4), the lateral direction slide cores 20B and 20C are moved to the lateral direction (the left and right direction in FIG. 4) in the closed space, to make it easy to release the lateral direction slide cores 20B and 20C from the FRP structure 10. After that, the lateral direction slide cores 20B and 20C are pulled out of the closed space of the FRP structure 10 (to the forward direction in FIG. 4), so that the die release of the core 20 can be carried out.

Figure 5:
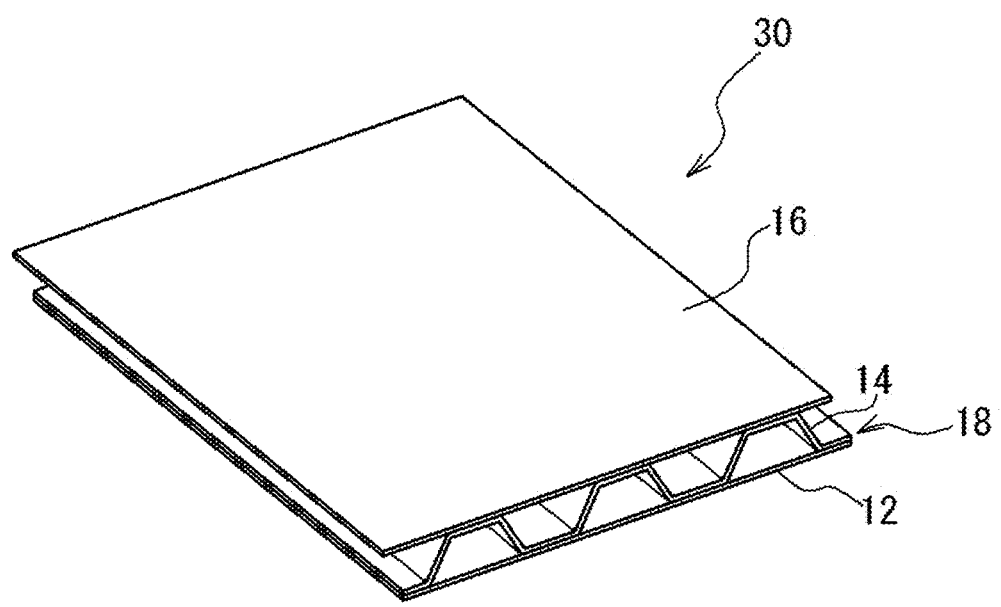
FIG. 5 is a perspective view showing the outward appearance of the FRP structure shaped by using the FRP shaping jig according to the embodiment.
Figure 6:
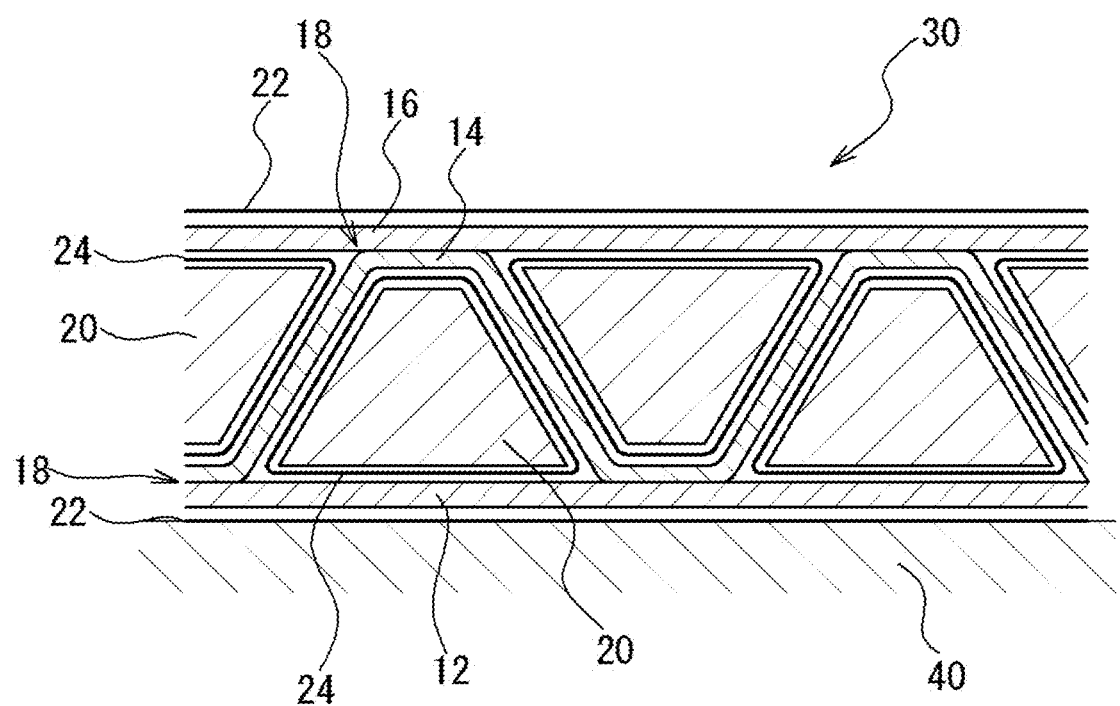
FIG. 6 is a diagram showing a state that the FRP structure is shaped by using the FRP shaping jig according to the embodiment and is a sectional view showing a state before shrinkage of a core.
Figure 7:
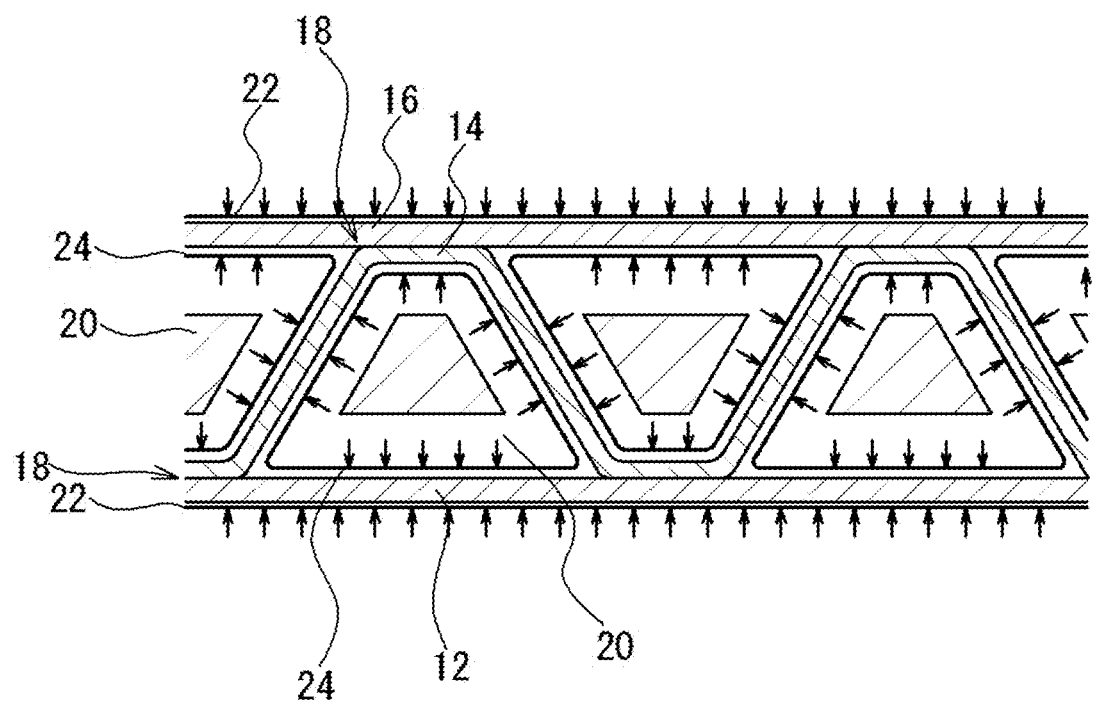
FIG. 7 is a diagram showing a state that the FRP structure is shaped by using the FRP shaping jig according to the embodiment and is a sectional view showing a state after the shrinkage of the core.
Figure 8:
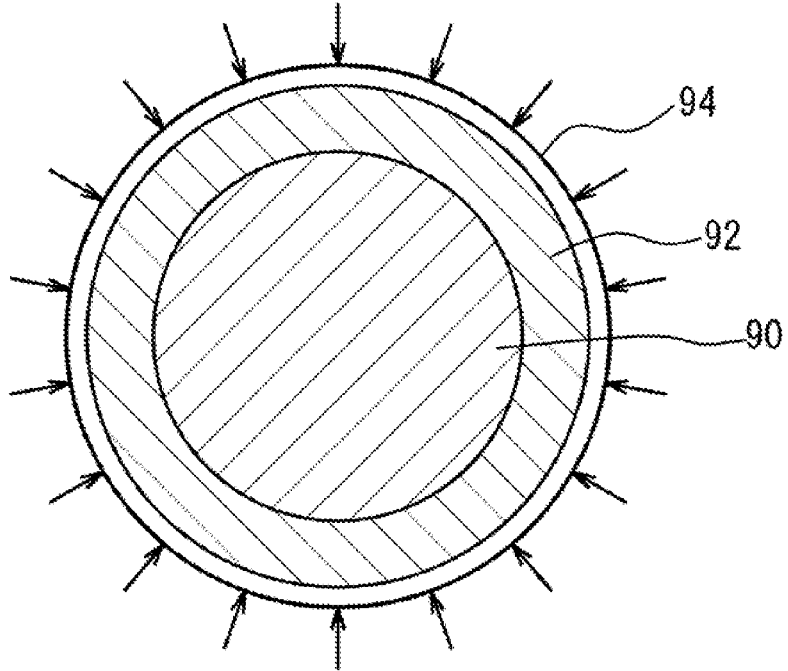
FIG. 8 is a sectional view showing a method of shaping the FRP structure by pressurizing from outside.
Figure 9:
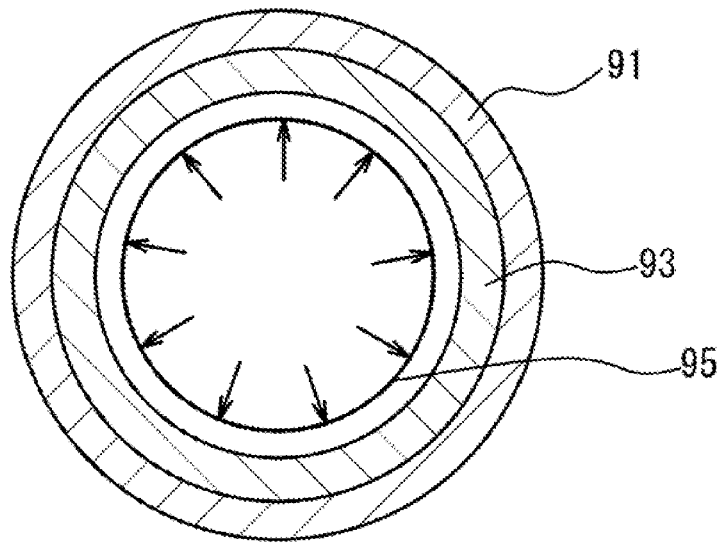
FIG. 9 is a sectional view showing the method of shaping the FRP structure by pressurizing from inside.

Next, an embodiment of a method of shaping the FRP structure 30 of a sandwich structure in which a plurality of stringers 14 are put between the outer skin 12 and the inner skin 16 will be described with reference to FIG. 5, FIG. 6 and FIG. 7. FIG. 5 is a perspective view showing an outward appearance of the FRP structure 30 shaped by using an FRP shaping jig. FIG. 6 is a diagram showing a state when the FRP structure 30 is shaped by using the FRP shaping jig and before the core 20 shrinks. FIG. 7 is a sectional view showing a state after the core 20 has shrunk. Note that the description of the parts having the same functions as the components of the embodiments shown in FIG. 1 to FIG. 3 is omitted.

The shaping of the FRP structure 10 in which the outer skin 12 and the stringer 14 are joined has been described with reference to FIG. 1 to FIG. 4. On the other hand, the FRP structure 30 shown in FIG. 5 has the structure in which a plurality of stringers 14 are put between the outer skin 12 and the inner skin 16. The FRP structure 30 shown in FIG. 5 can be shaped by using a bag, as shown in FIG. 6 and FIG. 7. The bag contains the core bag section 24 which covers the outer circumference of the core 20, and the coverture bag section 22 which covers a plurality of fiber components from outside. A plurality of the core bag sections 24 which are separate bodies may be prepared in correspondence to a plurality of cores 20. Alternatively, the core bag section 24 having a plurality of concave sections is prepared and the plurality of cores 20 may be arranged respectively in the plurality of concave sections.

Referring to FIG. 6, when shaping the FRP structure 30, the coverture bag section 22 (the first coverture bag section) is arranged on the jig 40 which has a predetermined shape. The outer skin 12 (the first fiber component) is arranges inside the coverture bag section 22. Next, a plurality of first cores 20, each of which is covered with the core bag section 24, are arranged on the outer skin 12 in the coverture bag section 22 according to need.

An adhesive material such as an adhesive film may be arranged between the outer skin 12 and the stringer 14. Then, the stringer 14 (the second fiber component) is arranged on the outer skin 12 and the first core 20.

Again, the second core 20 covered with the core bag section 24 is arranged on the stringer 14 (the second fiber component). The adhesive material such as the adhesive film is arranged between the stringer 14 and the inner skin 16 according to need, and the inner skin 16 (the third fiber component) is arranged on the second core 20 and the stringer 14.

Next, a portion where the fiber components of the outer skin 12, the stringer 14 and the inner skin 16 are arranged (that is, the inside of the bag) is evacuated to apply a pushing pressure to the joining section 18 by using the atmosphere pressure. At this time, when fiber reinforced base materials in which any resin has not been impregnated, are used as the material of the outer skin 12, the stringer 14 and the inner skin 16, a matrix resin is injected into the fiber reinforced base materials.

When a thermosetting type material is used as the adhesive material and the matrix resin, the heating is carried out after evacuation, to cure the adhesive material or the matrix resin.

Also, as shown in FIG. 7, when the material which shrinks through the heating (hard polystyrene foam, hard urethane foam and so on) is used as the material of the core 20, the core 20 shrinks by the heating in case of the curing. It becomes easy to pull out the core 20 from the closed space of the FRP structure 10 because the core 20 shrinks. The material which has the shrinkage characteristic at the curing temperature of the adhesive material or the matrix resin or below (the hard polystyrene foam, the hard urethane foam and so on) can be used as the material of the core 20. In this case, for example, it is desirable that the material has the thermal shrinkage characteristic in a temperature range from a temperature equal to or more than 50° C. to the curing temperature or below, and it is more desirable that the material has the thermal shrinkage characteristic in a temperature range from a temperature at which the adhesive material or matrix resin loses the fluidity, to the curing temperature or below. Note that the material with the shrinkage characteristic at the curing temperature or below through the heating may have the shrinkage characteristic in which the volume of the material becomes smaller by 1% or above than the volume at the room temperature in a temperature range from the room temperature or above to the curing temperature or below. Also, a brazing material which fuses by the heating may be used. In this case, it is desirable that the material has the thermal shrinkage characteristic in a temperature range from a temperature of 50° C. or above to the curing temperature or below, and it is more desirable that the material has the thermal shrinkage characteristic in a temperature range from a temperature at which the adhesive material or matrix resin loses the fluidity, to the curing temperature or below.

In the above, the FRP shaping jig and the method of shaping the FRP structure have been described with reference to the embodiments. However, the FRP shaping jig and the shaping method of the FRP structure according to the present invention are not limited to the above embodiments. Various modifications are possible to be carried out to the above embodiments. A technical matter described in one of the above embodiments and a technical matter of another embodiment may be combined.

Also, the FRP structure which has been manufactured by using the FRP shaping jig and the method of shaping the FRP structure according to the embodiments is used in various fields such as the fields of a vehicle, a ship, an aircraft or an architecture member. The FRP shaping jig and the production method of the FRP structure is suitable for a case where two or more fiber components are integrally shaped such that the structure has a final complicated shape with the closed space. Also, the FRP shaping jig and the production method of the FRP structure can be applied to the shaping of the FRP structure such as an RFI (resin film infusion shaping method), an RTM (resin transfer shaping method), a VaRTM (vacuum impregnation method), and so on.

The present application is based on Japanese Patent Application JP 2014-17314 that was filed on Jan. 31, 2014 and claims a priority. The disclosure thereof is incorporated herein by reference.

The invention claimed is:

1. An FRP shaping jig comprising:
a plurality of cores and a bag which are used to shape an FRP structure which contains a plurality of fiber components,
wherein the bag comprises:
a plurality of core bag sections which cover an outer circumference of the plurality of cores; and
a plurality of coverture bag sections which cover the plurality of fiber components,
wherein the plurality of core bag sections and the plurality of coverture bag sections are configured to be unified,
wherein air in spaces where each of the plurality of cores is arranged is separated from an inside of the bag, and
wherein a part of a first core in the plurality of cores is arranged over a part of a second core in the plurality of cores.

2. The FRP shaping jig according to claim 1, wherein the bag is configured such that each of the plurality of cores exists under an atmosphere pressure when the inside of the bag is evacuated.

3. The FRP shaping jig according to claim 1, wherein at least one of the plurality of cores has a split-type structure configured from a plurality of parts.

4. The FRP shaping jig according to claim 1, wherein at least one of the plurality of cores comprises a material that has a shrinkage characteristic or a melting characteristic after heating.

5. The FRP shaping jig according to claim 4, wherein an adhesive material or a matrix resin is arranged in a portion where two of the plurality of fiber components are joined to each other, and
wherein at least one of the plurality of cores is configured of a material that shrinks or melts at a curing temperature or below of the adhesive material or the matrix resin.

6. The FRP shaping jig according to claim 1, wherein at least one of the plurality of cores is configured of a material that has a brittleness and is releasable through fracturing or a material that has a flexibility.

7. The FRP shaping jig according to claim 1, wherein each of the plurality of core bag sections is an inverted portion of the bag.

* * * * *